United States Patent

[11] 3,590,347

[72] Inventors Heinrich Gottlob
Regensburg;
Gerhard Hoyler, Muenchen both of, Germany
[21] Appl. No. 834,248
[22] Filed June 18, 1969
[45] Patented June 29, 1971
[73] Assignee Siemens Aktiengesellschaft
[32] Priority June 25, 1968
[33] Germany
[31] P 17 64 549.7

[54] ELECTRICAL STACK AND LAYER CONSTRUCTION
8 Claims, 3 Drawing Figs.

[52] U.S. Cl. ............................ 317/258, 29/25.42, 317/261
[51] Int. Cl. ............................ H01g 3/06
[50] Field of Search ................. 317/258; 1/261; 29/25.42

[56] References Cited
UNITED STATES PATENTS
2,731,706  1/1956  Grouse .................. 29/25.42
3,346,789  10/1967  Robinson .............. 317/258
3,395,207  7/1968  Wilson ................... 317/258 X

*Primary Examiner*—E. A. Goldberg
*Attorney*—Hill, Sherman, Meroni, Gross and Simpson ABSTRACT: Electrical stack or layer condensers produced by dividing a master condenser into individual condensers have dielectric properties at the edges produced by their separation from the master condenser, which properties are substantially the same as those portions of the condensers intermediate the edges. The individual condensers are produced by breaking up the metallic coatings on the individual dielectric layers adjacent the edges formed during separation from the master condenser. In one embodiment, the individual dielectric layers are of a cast plastic material containing about 0.25 percent solvent residues. The heat buildup during cutting to separate the individual condensers and the solvent residues permit breakup of the metallic coating adjacent the edge being formed to provide a dielectric condition at the new edge which prevents arcing of oppositely poled layers along the new formed edges. Another embodiment employs metallic coated layers of plastic, alternately cast and extruded foils, to improve the regenerative properties of the condenser and to prevent arcing or breakdown at the edges of the individual condensers.

INVENTORS
HEINRICH GOTTLOB
GERHARD HOYLER

3,590,347

ELECTRICAL STACK AND LAYER CONSTRUCTION

BACKGROUND OF THE INVENTION

1. Field of the Invention

This invention relates to electric layer and stack condensers produced by dividing a master condenser into individual capacities, and more particularly to improving the dielectric properties at the edges of the individual capacities upon the separation of the master condenser into a plurality of individual capacities.

2. Description of the Prior Art

The provision of a plurality of individual condensers by dividing a master condenser is generally known in the art, for example German Pat. No. 892,321 discloses such condensers. There, dielectric foils and coatings or metallized dielectric foils and coatings are stratified upon each other to form a master condenser The desired individual or partial capacities are produced from the master condenser by two separation process perpendicular to each other. For example if the master condenser is coiled on a drum with a large diameter, the separation processes involve cutting or sawing the master condenser in the radial and peripheral directions.

It has been discovered that in the separation of the master condenser into the individual condensers the separation surfaces produced between metal coatings of what are to be opposite polarity electrodes or different potential electrodes spark-overs or arcings occur at relatively low voltages. Thereby the contacting of such condensers is damaged and the insulation quality is decreased.

Both cast and extruded foils are applicable as dielectric foils in the production of condensers. In producing cast foils the plastic is completely dissolved in a solvent and the solution is then applied as a thin film or thin layer to a support, dried, and removed as a foil from the support. Generally, the dissolved plastic is thereby fed from a tank to an endless belt or a rotary roller, and after drying is removed from the belt or roller. In order to facilitate further operations in producing the master condenser, the foil may be stretched.

In producing extruded foils, the plastic is melted in a tank and the melt is sprayed under pressure through a nozzle or a narrow slot to a support, for example an endless belt, a roller or a tensioning frame, and is pulled from the nozzle as a foil.

It has been discovered that in producing layer condensers by dividing a master condenser into a plurality of individual condensers, zones of low dielectric strength are present at the separation points. The master condenser may be a large stack condenser or a master condenser wound and produced on a drum having a large diameter. If the dielectricum consist of cast plastic foils still containing residues of solvent from the production process, the separation of the winding bodies into individual condensers causes problems, particularly at higher capacity values (exemplified by large separation surfaces). Upon the application of voltage loads, incurable spark-overs occur in a relatively narrow area adjacent the separation surfaces which will lead to a short circuit of the condenser. By removing the remnants of the solvent prior to winding the master condenser and/or building the master stack condenser, for example by storing the foils at elevated temperature in a vacuum or by utilizing extruded foil which contains no solvents, although then no irreparable spark-overs occur in the critical zone, nevertheless, spark-overs may already occur at relatively low voltages, say at approximately 250 volts at a dielectric layer thickness of 5 microns. Thus, in these cutting surfaces the dielectric strength becomes less than the dielectric strength inside the condenser, because only the air acts as an electrode gap of the size of the thickness of the dielectric layer. For operations at low voltages, for example at less than 10 volts at 5 microns dielectric layer thickness, this dielectric strength is sufficient. At higher rated voltages, the aforementioned difficulties come into play.

SUMMARY OF THE INVENTION

According to the invention, individual condensers are produced from a master condenser, which individual condensers possess a dielectric strength at the separating surfaces which is substantially the dielectric strength to be expected in the other dielectricum areas, and whereat the edges of the condensers a satisfactory regeneration takes place.

Also, according to the present invention, the foregoing is achieved through the utilization of materials for at least a part of the dielectric foils which contains remnants of solvent.

BRIEF DESCRIPTION OF THE DRAWINGS

Other objects, features and advantages of the invention, its organization, construction and operation will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
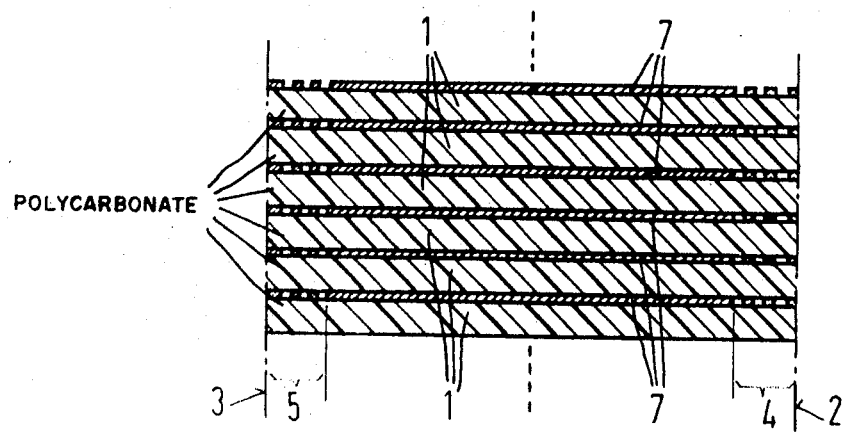
FIG. 1 is a cross-sectional elevational view of a condenser according to the invention.

In general, the drawings illustrate individual condensers which have been separated from master condensers at the edges 2 and 3 formed during the separation. In the drawings, dielectric substrates 1 and 6 carry metal coatings 7 thereon to form the individual plates of the condensers, with the external connections to the metal layers 7 to be provided at edges parallel to the plane of the drawings and in front and in back of the sheet as viewed.

When dividing a master condenser into individual condensers, a short-time heating takes place at the separation surfaces 2 and 3, particularly when sawing with a rotary saw blade is the method of separation. Due to this heating, the dielectric foils shrink to sawing surfaces and the metal coating 7 is destroyed at the areas adjacent the cut surfaces and breaks up in the form of chips or clods. Thus, in the vicinity of the cut surfaces, insulation paths are created which prevent short circuits between metal coatings 7 which are to be connected as opposite polarity electrodes. It has been discovered that as a result of the presence of solvent residues in the dielectric layers, the formation of insulation edges resulting alone from the local shrinkage process occurring at the cutting edges may be considerably increased.

The dielectric strength can be increased substantially according to the present invention that it is in the order of the dielectric strength of the dielectric layer in the interior portions of the condenser. For example, a dielectric strength of 700 volts results for a polycarbonate foil of 5 microns thickness when it contains about 0.25 percent solvent residue. The foils are then subjected in the area adjacent the cutting surfaces to geometric changes caused by the heat buildup during the sawing operation in connection with the residual solution, at least at the surface, whereby the metallic coatings 7 is destroyed. However, this change must not go far during too high or a long lasting heat effect the foil is injured, as then the danger of irreparable short circuits exist. This can be accomplished on one hand by appropriate proportioning of the solvent content of the plastic material, either by addition (storage in the atmosphere of the gaseous solvent) or by reduction (drying at higher temperature, possibly at low pressure) of the corresponding solvent, or by observing during the sawing of operation a defined thermal effect. The addition of solvent shall take place at least in the zones adjacent the cutting surfaces.

When employing a separation process to provide the individual condensers from a master condenser wherein no heat is generated, the formation of the insulation edge may be caused by a special heat treatment of the cutting surfaces.

An additional improvement, particularly of the regenerative properties of the condenser, can be accomplished by alternately superposing foils with solvent residues and foils without soft residues as dielectricum foils. Then a foil without solvent residue is always placed between two foils having solvent residue. This can be done by two measures. First, cast foils may be employed exclusively and the residues of solvent are eliminated prior to the production of the master condenser from part of these foils. If will be advantageous to provide these foils regenerably thin coats whereby during the metal steaming operation large quantities of the solvent are expelled. Then the metal-streamed foils are placed in a heated vacuum furnace and maintained therein under controlled conditions. For example, 8 mm. wide polycarbonate foils with about 0.5 percent residual solvent may be stored for 8 days in a vacuum furnace at $10^{13}$ Torr and at 110° C. As a result of the measures described above, when the foils contain too high a share of solvent residue, the regenerative capacity in the zones adjacent the cutting surfaces is prevented from being reduced. This is particularly advantageous where the sawed surfaces are large, that is greater than about 2 cm$^2$.

In the second case it is possible to superpose for the dielectric layers alternately extruded foils containing no solvent residue and cast foils which do contain solvent residues. The extruded foils must be so selected in this case that they will not be attacked by the solvent of the cast foils for example by swelling on, or otherwise. This generally applies for both types of foils. Foil without residues of solvent must not be attacked by the solvent residues of the other foil. Polycarbonate foils may be employed as cast foil and polyethylene terephthalate foil may be employed as an extruded foil.

Irreparable spark-overs will not occur either in larger separation surfaces and no flash-overs occur at the voltages of about 500 volts with dielectric foils of 5 microns thickness at the separation surfaces between metal coatings of different potentials. To better exemplify the invention and its advantages, attention is invited to FIG. 1 which illustrates dielectric layers 1 each carrying regenerably thin coats 7, whereby the frontal surfaces to be contacted are parallel with the drawing surface. The layers 1 are of the cast type which contain solvent residues and in which insulating areas 4 and 5 are produced adjacent the cutting surfaces 2 and 3, respectively, due to the buildup of heat effected upon these cutting surfaces. The insulation edges 4 and 5 are produced these areas being broken open and elevated by the clodlike portions 8 formed from the metallic coatings 7. The coatings of opposite polarity of the condenser are thus insulated from each other adjacent the edges of the condenser in a satisfactory manner.

Figure 2:
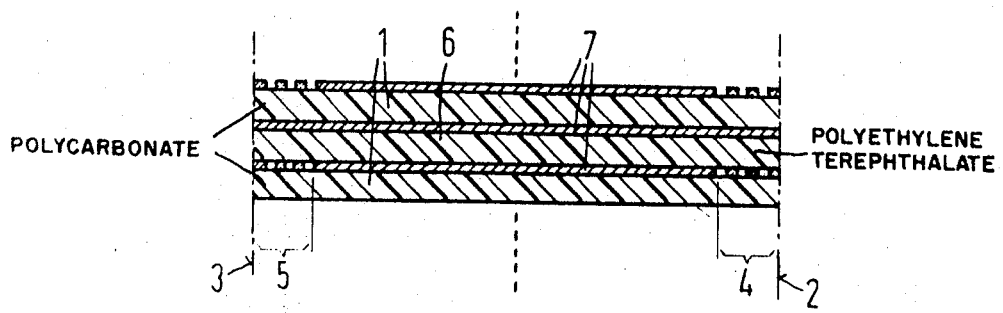
FIG. 2 is a cross-sectional elevational view of another condenser according to the present invention.
Figure 3:
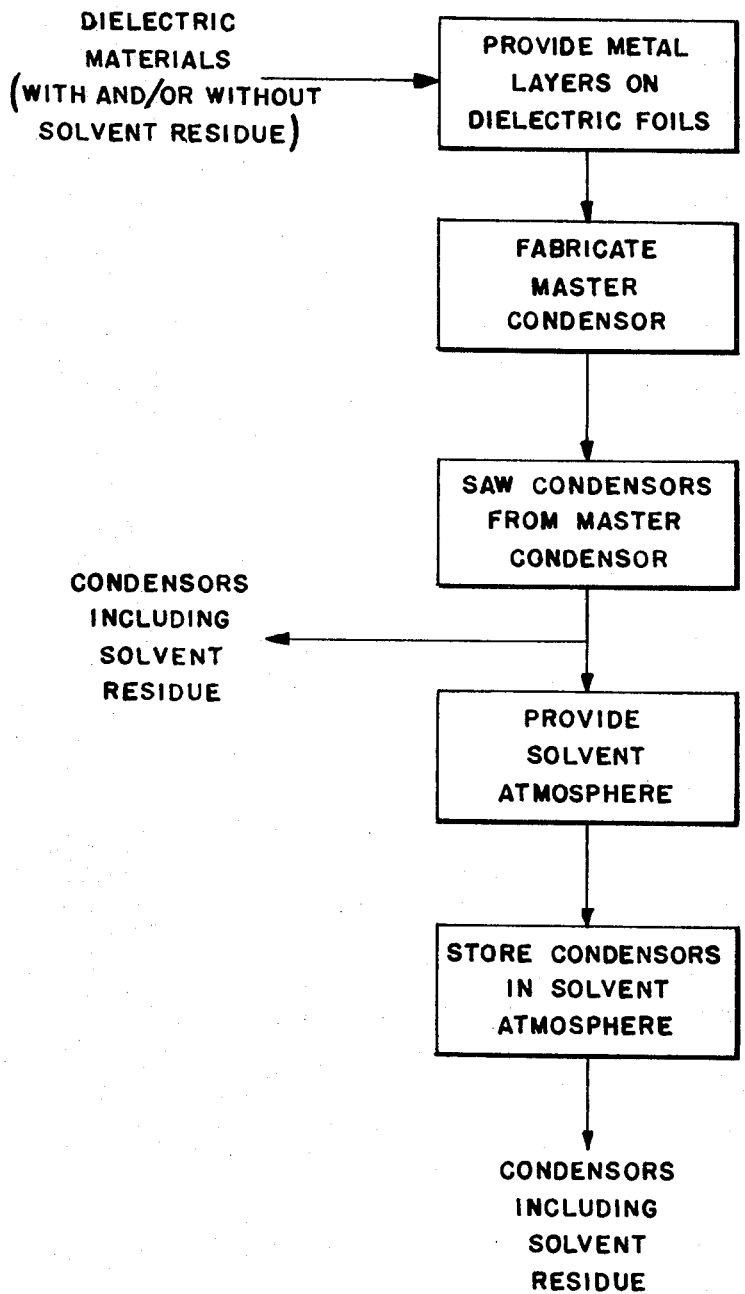
FIG. 3 is a flow chart illustrating the method of capacitor construction according to the invention.

Referring now specifically to FIG. 2 there is illustrated another condenser construction according to the present invention wherein alternately metallized dielectric foils 1 containing solvent residues and metallized dielectric foils 6 (extruded type) which contain no solvent residues are superposed one upon the other. The cutting surfaces 2 and 3 of the finished stacked condenser are perpendicular to the drawing surface and the frontal surfaces to be contacted are placed parallel with the drawing surface, as previously stated. The metallic coatings 7 carried by dielectric foils 1 (containing solvent) break up during the tempering of the cut surfaces in clodlike portions 8, as above-discussed, in the marginal zones 4 and 5 adjacent the cut surfaces so that adequate insulation is provided in these zones adjacent the edges 2 and 3. The coatings 7 on the dielectric foils without solvent residues remain practically unharmed. Such condensers show, besides high dielectric strength good regenerative properties.

What We claim is:

1. An electric condenser comprising a plurality of stacked dielectric foils, some of said foils including solvent residue and disposed alternately with others of said foils which are free of solvent residue, each of said foils carrying a metal layer, and each of said metal layers which are carried by said foils which include solvent residue including edges and a plurality of separate portions of the metal layer adjacent said edges.

2. An electric condenser according to claim 1 wherein the dielectric foils which include solvent residues consist of polycarbonate having solvent residue amounting to about 0.25 percent.

3. An electric condenser according to claim 1, wherein extruded foils, and cast foils including solvent residues, are superposed as the dielectric foils.

4. An electrical condenser according to claim 3, wherein said extruded foils consist of polyethylene terephthalate and the cast foils consist of polycarbonate.

5. An electrical condenser according to claim 1, wherein the dielectric foils which include solvent residue consist of polycarbonate having the share of residual solvent amounting to about 0.25 percent.

6. A method for producing electrical condensers from a master condenser including a stack of superposed dielectric foils each of which carry a metallic layer, comprising the steps of separating the master condenser substantially perpendicular to the layers to form a plurality of individual condensers, contemporaneously heating the edges of the individual condensers during separation thereof from the master condenser, and adding solvent to the dielectric material.

7. A method according to claim 6 wherein the steps of separating and contemporaneously heating are further defined by the step of sawing the individual condensers from the master condenser.

8. A method according to claim 6 wherein the step of adding solvent is further defined by the steps of providing a solvent atmosphere and storing the individual condensers in the solvent atmosphere.

UNITED STATES PATENT OFFICE
CERTIFICATE OF CORRECTION

Patent No. 3,590,347               Dated     June 29, 1971

Inventor(s)  Heinrich Gottlob and Gerhard Hoyler

It is certified that error appears in the above-identified patent and that said Letters Patent are hereby corrected as shown below:

In the Specification, column 1, line 19, read "condenser The" as -- condenser. The --.
      Line 29, read "or" as -- and/or --.
      Column 2, line 23, delete "and".
      Column 3, line 20, read "$10^{13}$" as -- $10^{-3}$ --.
      Column 4, line 4, read "2 and 2" as -- 2 and 3 --.

Signed and sealed this 14th day of March 1972.

(SEAL)
Attest:

EDWARD M. FLETCHER, JR.                ROBERT GOTTSCHALK
Attesting Officer                      Commissioner of Patents